United States Patent
El Aimani

(10) Patent No.: US 9,071,442 B2
(45) Date of Patent: Jun. 30, 2015

(54) SIGNCRYPTION METHOD AND DEVICE AND CORRESPONDING SIGNCRYPTION VERIFICATION METHOD AND DEVICE

(75) Inventor: Laila El Aimani, Rennes (FR)

(73) Assignee: THOMSON LICENSING, Issy Les Moulineaux (FR)

( * ) Notice: Subject to any disclaimer, the term of this patent is extended or adjusted under 35 U.S.C. 154(b) by 171 days.

(21) Appl. No.: 13/585,685

(22) Filed: Aug. 14, 2012

(65) Prior Publication Data

US 2013/0051551 A1 Feb. 28, 2013

(30) Foreign Application Priority Data

Aug. 29, 2011 (EP) .................................. 11306076

(51) Int. Cl.
*H04L 9/30* (2006.01)
*H04L 9/32* (2006.01)
*H04L 9/00* (2006.01)

(52) U.S. Cl.
CPC ................ *H04L 9/3247* (2013.01); *H04L 9/30* (2013.01); *H04L 2209/60* (2013.01); *H04L 2209/72* (2013.01); *H04L 9/008* (2013.01)

(58) Field of Classification Search
None
See application file for complete search history.

(56) References Cited

U.S. PATENT DOCUMENTS

2005/0240762 A1 10/2005 Mao

FOREIGN PATENT DOCUMENTS

WO WO2011079583 7/2011

OTHER PUBLICATIONS

El Almani, "Genetic: Constructions Verifiable Sigcryption", retrieved from the Internet: URL http://eprint.iacr.org/2011/592.pdf, Nov. 2, 2011.
El Aimani et al., "Efficient Confirm Signatures from the a Signature of a Commitmenta Paradigm", Provable Security, Berlin Heidelberg, Oct. 13, 2010, pp. 87-101.
El Aimani, "Design and Analysis of Opaque Signatures", Dissertation Rheinischen Friedrich-Wilhelms-Universitat Bonn, Apr. 29, 2011, p. 1-218.
European Search Report dated Feb. 14, 2012.
Jee et al., "On the Security of Joint Signature and Encryption", Advances in Cryptology—Eurocrypt 2002 Proceedings, Lecture Notes in Computer Science vol. 2332, L. Knudsen ed, Springer-Verlag, 2002, pp. 1-22.
Tatara et al., "A Signature Scheme Associated With Universal Re-Signcryption", 2009 International Conf on Availability, Reliability and Security, Mar. 16, 2009, Fukuoka, Japan, pp. 780-785.

(Continued)

*Primary Examiner* — Fatoumata Traore
(74) *Attorney, Agent, or Firm* — Tutunjian & Bitetto, P.C.

(57) ABSTRACT

A signcryption is generated by a sender by using a first encryption algorithm to encrypt plaintext m with public key Epk to get ciphertext e, e=E.Encrypt(m); generating a key k and its encapsulation c using an encapsulation algorithm and public key Kpk, k,c=KD.Encapsulate( ); sign (e,c) using Ssk, s=S.sign(e,c); encrypt the signature s using a second encryption algorithm and the key k, e_d=D.Encrypt(s). The signcryption of m is formed by (e,c,e_d). The sender may also prove knowledge of the decryption of e, and that e_d encrypts a valid signature on the concatenation of c and e using the key of the encapsulation. Also provided are the corresponding signcryption verification device and method, and computer program products.

10 Claims, 2 Drawing Sheets

(56) References Cited

OTHER PUBLICATIONS

Matsuda et al., "Efficient Constructions of Signcryption Schemes and Signcryption Composability", Progress in Cryptology—INDOCRYPT 2009 Proceedings, Lecture Notes in Computer Science, vol. 5922, B Roy and N. Sandrier ed, Springer-Verlag, 2009, pp. 321-342.

Huang et al., "Heterogeneous Signcryption With Key Privacy", The Computer Journal, vol. 54, No. 4, Apr. 2011, pp. 525-536.

Tso et al., "An Improved Signcryption Scheme and Its Variation", 4th International Conference on Information Technology (ITNG'07), Apr. 2, 2007, Las Vegas, Nevada, USA, pp. 772-778.

Boneh et al., "Short Group Signatures"—Advances in Cryptology—Crypto 2004, vol. 3152 of Lecture Notes in Computer Science, pp. 41-55, Berlin, Springer-Verlag, 2004.

El Aimani, Laila, "On Generic Constructions of Designated Confirmer Signatures", 10th International Conference on Cryptology, New Delhi, India, Dec. 13-16, 2009, pp. 1-21.

Bellare et al., "Random Oracles are Practical: A Paradigm for Designing Efficient Protocols", ACM Conference on Computer and Communications Security, Nov. 1, 1993, pp. 62-73.

Goldreich et al., "How to Prove all NP-Statements in Zero-Knowledge, and a Methodology of Cryptographic Protocol Design" —Advances in Cryptology—Crypto 1986, pp. 171-185, Berlin, Springer-Verlag, 1987.

Paillier, Pascal, "Public-Key Cryptosystems Based on Composite Degree Residuosity Classes", Eurocrypt 1999, pp. 223-238, Berlin, Springer-Verlag, 1999.

El Gamal, Taher, "A Public Key Cryptosystem and a Signature Scheme Based on Discrete Logarithms", Advances in Cryptology—Crypto 1984, pp. 10-18, Berlin, Springer-Verlag, 1985.

SIGNCRYPTION METHOD AND DEVICE AND CORRESPONDING SIGNCRYPTION VERIFICATION METHOD AND DEVICE

This application claims the benefit, under 35 U.S.C. §119 of EP Patent Application 11306076.8, filed 29 Aug. 2011.

TECHNICAL FIELD

The present invention relates generally to cryptography, and in particular to signcryption.

BACKGROUND

This section is intended to introduce the reader to various aspects of art, which may be related to various aspects of the present invention that are described and/or claimed below. This discussion is believed to be helpful in providing the reader with background information to facilitate a better understanding of the various aspects of the present invention. Accordingly, it should be understood that these statements are to be read in this light, and not as admissions of prior art.

There are many different cryptographic schemes. Leila El Aimani describes a few in "Design and Analysis of Opaque Signatures", Dissertation Rheinischen Friedrich-Wilhelms-Universität Bonn (http://hss.ulb.uni-bonn.de/2011/2541/2541.pdf), notably confirmer and undeniable signatures, i.e. signatures where the verification cannot be achieved without cooperation with some entity. In this thesis, the author essentially studies how to build such signatures from basic cryptographic primitives. She shows that the traditional paradigms (e.g. Encrypt_then_Sign and Commit_then_Encrypt_and_Sign) need expensive encryption in order to meet a reasonable security level. Next, she shows that small adjustments make the constructions thrive on cheap encryption, which positively impacts the efficiency (e.g. cost, bandwidth, verifiability) of the resulting signatures. However, the signatures do not offer encryption of the message to be signed.

Cryptographic mechanisms that proffer both signature and encryption functionalities, so-called signcryption, are becoming more and more widespread as many real-life applications require both confidentiality and authenticity/integrity of the transmitted data. An illustrative example is electronic elections in which encryption is needed to guarantee the voter's privacy, while at the same time the voting center needs to ensure that the encrypted vote comes from the voter.

Building such mechanisms from basic cryptographic primitives is customary in cryptography as it allows achieving easy-to-analyze schemes, compared to dedicated, monolithic constructions. The most popular prior art paradigms used to devise these mechanisms from basic cryptographic primitives are the "encrypt_then_sign" (EtS) and the "sign_then_encrypt" (StE) paradigms.

Encrypt_then_sign (EtS)

The sender has a public key/secret key pair (Spk, Ssk) and the receiver has a different public key/secret key pair (Epk, Esk).

The sender encrypts a plaintext m using the receiver's public key Epk to obtain ciphertext e. Then the ciphertext e is signed using the sender's secret key Ssk to obtain a signature s. The pair (e, s) forms the signcryption of plaintext m.

The sender can at that time also prove knowledge of the message underlying the encryption e. The skilled person will appreciate that this can be efficiently performed if the used encryption scheme belongs to the "class E" (see Leila El Aimani: Efficient Confirmer Signatures from the "Signature of a Commitment" Paradigm. ProvSec 2010: 87-101. The paper also describes the required protocol along with its security proof for confirmer signatures from the Commit_then_Encrypt_and_Sign paradigm. It is shown that the paradigm must rest on expensive encryption in order to lead to secure confirmer signatures. However, a small tweak makes it thrive on very cheap encryption leading consequently to constructions with many practical realizations. The paper further sheds light on a particular case of this technique, namely Encrypt_then_Sign, and presents several practical realizations of confirmer signatures using this solution. However, the primitive subject to this study does not allow encryption of the message to be signed.) Class E consists of homomorphic encryption schemes that accept efficient protocols for proving that a given ciphertext encrypts a given message. Examples of such encryption schemes are ElGamal's encryption [Taher El Gamal: A Public Key Cryptosystem and a Signature Scheme Based on Discrete Logarithms. CRYPTO 1984:10-18], Paillier's encryption [Public-Key Cryptosystems Based on Composite Degree Residuosity Classes. EUROCRYPT 1999: 223-238] and the Linear Diffie-Hellman KEM/DEM [Dan Boneh, Xavier Boyen, Hovav Shacham: Short Group Signatures. CRYPTO 2004: 41-55].

The receiver uses the sender's public key Spk to check that the signature s of the ciphertext e is correct. Then, if the signature is correct, the receiver decrypts the ciphertext e using the receiver's secret key Esk to obtain plaintext message m.

The receiver may at any time prove to anyone that m is (or isn't) the decryption of e, preferably without disclosing the private key. In EtS such proofs, called "confirm/deny protocols", amount to proving that a ciphertext is (or isn't) the decryption of a given message. These proofs make sense when it is difficult to check whether a given ciphertext encrypts a given message, i.e. when the used encryption scheme satisfies the indistinguishability property which posits the difficulty to distinguish ciphertexts based on the underlying messages. Typically, given two messages and an encryption of one of them, one should not be able to tell which message corresponds to the given ciphertext. Since the security of the Signcryption constructions requires the indistinguishability property of the underlying encryption, encryption schemes that allow the aforementioned proofs to be efficiently carried out must be considered. Again, encryption schemes from the class E achieve this goal as shown in [Laila El Aimani: Efficient Confirmer Signatures from the "Signature of a Commitment" Paradigm. ProvSec 2010: 87-101].

Sign_then_encrypt (StE)

As in EtS, the sender has a public key/secret key pair (Spk, Ssk) and the receiver has a different public key/secret key pair (Epk, Esk).

StE can be implemented in a simple manner using a prior art signature method and a prior art signature encryption method.

US 2005/240762 describes another solution for signcrypting a message using the Sign_then_Encrypt paradigm. The idea consists in first producing a signature, using RSA, on the message to be signed, and then encrypting, using again the RSA yet with a different key pair, the produced signature. The result forms the signcryption of the message in question. De-signcrypting (decrypting and verifying) this signcryption is done by first decrypting it, verifying the output signature on the encoding, and finally recovering the message underlying the encoding. The solution does not appear to provide the verifiability functionality, i.e. efficiently proving the well formedness of the produced signcryption without the presence of the message. Indeed, efficient verifiability of the solution does not seem plausible due to the presence of hash functions and XOR operators that destroy any algebraic property susceptible of easing the verifiability.

Another way to implement StE is to build a signcryption scheme from a digital signature scheme and an encryption scheme; it is a combination of two mechanisms: A Key Encapsulation Mechanism (KEM) which is a mechanism for session keys generation, and a Data Encapsulation Mechanism (DEM) which is a symmetric key encryption scheme.

KEM consists of a triplet of algorithms (Key generation, Encapsulation, Decapsulation). Key generation generates a key pair (pk,sk). Encapsulation generates a key k and its encapsulation c using pk, and Decapsulation retrieves the key from its encapsulation using the private key sk. An example is the KEM underlying the ElGamal encryption scheme.

DEM—Data Encapsulation Mechanisms—encrypt data, usually using a symmetric key encryption algorithm.

StE is illustrated in FIG. 1. A random number r, KEM's encapsulation algorithm and a public key pk are used to obtain a session key k and its encapsulation c. The sender then uses its secret key Ssk to sign a concatenation of the plaintext m and the encapsulation c, thus obtaining signature s. (not illustrated). The DEM encryption algorithm and the session key k are used to encrypt (m,s) and obtain e. The pair (c,e) forms the signcryption of m. To "unsigncrypt" (c,e), the session key k is recovered from its encapsulation c using KEM's decapsulation algorithm and the private key. Then DEM's decryption algorithm and the session key k are used to decrypt e to obtain (m,s). Finally, the validity of the signature s may be verified using the sender's public key.

The sender further needs to prove the validity of the obtained signcryption. In StE, this proof comes to proving the knowledge of the decryption of e, and that this decryption is the concatenation of the message to be signcrypted and of a signature on this very message concatenated with c.

The proof is plausible from a theoretical viewpoint [Oded Goldreich, Silvio Micali, Avi Wigderson: How to Prove all NP-Statements in Zero-Knowledge, and a Methodology of Cryptographic Protocol Design. CRYPTO 1986: 171-185]. However, it is not known how to do it efficiently as the data to be proven consists of bit-strings and not of algebraic elements.

An example of a KEM/DEM encryption scheme is ELGamal's encryption:
1. ElGamal.Setup. We work in a group G denoted multiplicatively, generated by some g. The group G is finite and has order some d.
2. ElGamal.Keygen. The key generation algorithm inputs a security parameter and outputs an integer x in $Z_d$, and the group element $y=g^x$. The key pair is (sk=x,pk=y).
3. ElGamal.Encrypt (m). [First step: KEM encapsulation algorithm]: generate a key $k=y^r$ and its encapsulation $c=g^r$ using some random r in $Z_d$. [Second step: DEM encryption algorithm]: encrypt m in $e=m \cdot k$. [Final output]: (c,e) forms the encryption of m.
4. ElGamal.Decrypt (c,e). [First step: KEM decapsulation algorithm]: using x, recover from c the key k as $k=c^x=(g^r)^x=(g^x)^r=y^r$ [Second step: DEM decryption algorithm]: recover m as $m=c \cdot k^{-1}$.

Finally, in order to be able to prove the validity of the constructions efficiently it is required that the used encryption schemes (derived from the KEM/DEM paradigm) belong to the previously mentioned "class E", i.e. that the encryption is homomorphic and accepts efficient proofs for proving that a given ciphertext encrypts a given message. This is the case for El Gamal's encryption.

In general, the following properties are required for verifiable signcryption:

1. Unforgeability: it is computationally infeasible to impersonate the sender for some message (not necessarily controlled by the adversary).
2. Indistinguishability: it should be computationally infeasible to infer any information about the message from its signcryption.
3. Verifiability: the possibility to prove efficiently the validity of a signcryption.

Considering once more the example of electronic elections, the voting center might require from the voter a proof of validity of the "signcrypted" vote. Also, the trusted party (the receiver) that decrypts the vote might be compelled, for instance in order to resolve later disputes, to prove that the sender has indeed produced the vote in question. Therefore, it would be desirable to support the receiver with efficient means to provide such a proof without having to disclose his private key.

In light of these properties, EtS and StE perform as follows:

EtS compares better with respect to verifiability, since the sender simply has needs to prove knowledge of the decryption of a given ciphertext. Also, the receiver has to prove that a message is or is not the decryption of a given ciphertext. Such proofs are easy to carry out if one considers a special class of encryption called homomorphic encryption. However, in order to achieve indistinguishability, EtS exacts that the underlying signature scheme satisfies the highest security notion, i.e. strong unforgeability under chosen message attacks which informally denotes the difficulty to obtain a new signature on a message for which the adversary might have obtained one or several signatures. Such a need is justified by the possibility, in case the signature scheme does not satisfy the aforementioned requirement, to create a new signcryption on any message given one signcryption on it (just generate a new digital signature on the encryption e). Such a possibility entitles the indistinguishability adversary to retrieve the message in most popular attack models.

StE does not require high security notions on the underlying signature scheme since in this case the adversary does not have in clear the involved digital signature. Another argument in favour of StE is that it provides full anonymity of the sender; the signcryption on a message m is a ciphertext, whereas in EtS, everyone can check whether the sender was involved in a signcryption (e,s) by simply checking the validity of the digital signature (using the sender's public key) on the ciphertext e. However, verifiability turns out to be a hurdle: the technique applies the signing algorithm (of the used signature scheme) to the message to be signcrypted concatenated with the used encapsulation. It further produces an encryption of the resulting signature concatenated with the message in question. To prove the validity of the produced signcryption, it is necessary to exploit the homomorphic properties of the signature and of the encryption schemes in order to provide proofs of knowledge of the encrypted signature and message. As a consequence, the used encryption and signature schemes need to operate on elements from a set with a known algebraic structure rather than on bit-strings.

To sum-up, EtS provides efficient verifiability at the expense of the sender's anonymity and of the security requirements on the building blocks. StE achieves better privacy using cheap constituents at the expense of verifiability.

The skilled person will appreciate that there is a need for a solution that combines the advantages of EtS and StE, while avoiding their drawbacks. This invention provides such a solution.

SUMMARY OF INVENTION

In a first aspect, the invention is directed to a method of signcrypting a plaintext m. A device encrypts the plaintext m with a first encryption algorithm and a first public key Epk to obtain a first ciphertext e; using a random r, an encapsulation algorithm and a second public key Kpk to generate a session key k and an encapsulation c of the session key k; generates a signature s on the first ciphertext e and the encapsulation c with a signature algorithm using a private signature key Ssk; encrypts the signature s with a second encryption algorithm using the session key k to obtain a second ciphertext e_d; forms the signcryption from the first ciphertext e, the encapsulation c and the second ciphertext e_d; and outputs the signcryption.

In a first preferred embodiment, the device further proves knowledge of the decryption of the first ciphertext e and that the second ciphertext e_d encrypts a valid signature s on the encapsulation c and the first ciphertext e using the key of the encapsulation c.

In a second aspect, the invention is directed to a method of unsigncrypting a received signcryption of a plaintext m, the signcryption comprising a first ciphertext e, an encapsulation c and a second ciphertext e_d. A device decrypts the first ciphertext e using a first decryption algorithm and a first private key Esk corresponding to a first public key Epk that was used to encrypt the first ciphertext e; retrieves a session key k by decapsulating the encapsulation c using a decapsulation algorithm and a second private key Ksk corresponding to a second public key Kpk used to encapsulate the session key k; recovers a signature s by decrypting the second ciphertext e_d using a second decryption algorithm and the session key k; and verifies that the signature s is correct using a verification algorithm and a public signature key Spk that corresponds to a private signature key Ssk used to generate the signature.

In a first preferred embodiment, the device further proves knowledge of the equality or inequality of the decryption of the plaintext m and the first ciphertext e, the decryption of the second ciphertext e_d and that the decryption is a valid digital signature on the first ciphertext e and the encapsulation c.

In a third aspect, the invention is directed to a signcryption device for signcrypting a plaintext m. The signcryption device comprises a processor configured to: encrypt the plaintext m with a first encryption algorithm and a first public key Epk to obtain a first ciphertext e; use a random r, an encapsulation algorithm and a second public key Kpk to generate a session key k and an encapsulation c of the session key k; generate a signature s on the first ciphertext e and the encapsulation c with a signature algorithm using a private signature key Ssk; encrypt the signature s with a second encryption algorithm using the session key k to obtain a second ciphertext e_d; and form the signcryption from the first ciphertext e, the encapsulation c and the second ciphertext e_d. The device further comprises an interface configured to output the signcryption.

In a first preferred embodiment, the processor is further configured to prove knowledge of the decryption of the first ciphertext e and that the second ciphertext e_d encrypts a valid signature s on the encapsulation c and the first ciphertext e using the key of the encapsulation c.

In a fourth aspect, the invention is directed to a signcryption verification device for verifying a received signcryption of a plaintext m, the signcryption comprising a first ciphertext e, an encapsulation c and a second ciphertext e_d. The signcryption verification device comprises a processor configured to: decrypt the first ciphertext e using a first decryption algorithm and a first private key Esk corresponding to a first public key Epk that was used to encrypt the first ciphertext e; retrieve a session key k by decapsulating the encapsulation c using a decapsulation algorithm and a second private key Ksk corresponding to a second public key Kpk used to encapsulate the session key k; recover a signature s by decrypting the second ciphertext e_d using a second decryption algorithm and the session key k; and verify that the signature s is correct using a verification algorithm and a public signature key Spk that corresponds to a private signature key Ssk used to generate the signature.

In a first preferred embodiment, the processor is further configured to prove knowledge of the equality or inequality of the decryption of the plaintext m and the first ciphertext e, and whether or not the signature s is a valid digital signature on the first ciphertext e and the encapsulation c.

In a fifth aspect, the invention is directed to a computer program product having stored thereon instructions that, when executed by a processor, perform the method of any embodiment of the method of the first aspect.

In a sixth aspect, the invention is directed to a computer program product having stored thereon instructions that, when executed by a processor, perform the method of any embodiment of the method of the second aspect.

BRIEF DESCRIPTION OF DRAWINGS

Preferred features of the present invention will now be described, by way of non-limiting example, with reference to the accompanying drawings, in which.

DESCRIPTION OF EMBODIMENTS

A main inventive idea of the present invention consists in first encrypting the plaintext to be signcrypted using a public key encryption scheme, then applying a variant of StE to the produced ciphertext. The result of this variant STE and the ciphertext forms the new signcryption of the plaintext.

In a sense, this technique can be seen as a combination of EtS and StE; thus it can be termed "encrypt_then_sign_then_encrypt" (EtStE).

Figure 2:
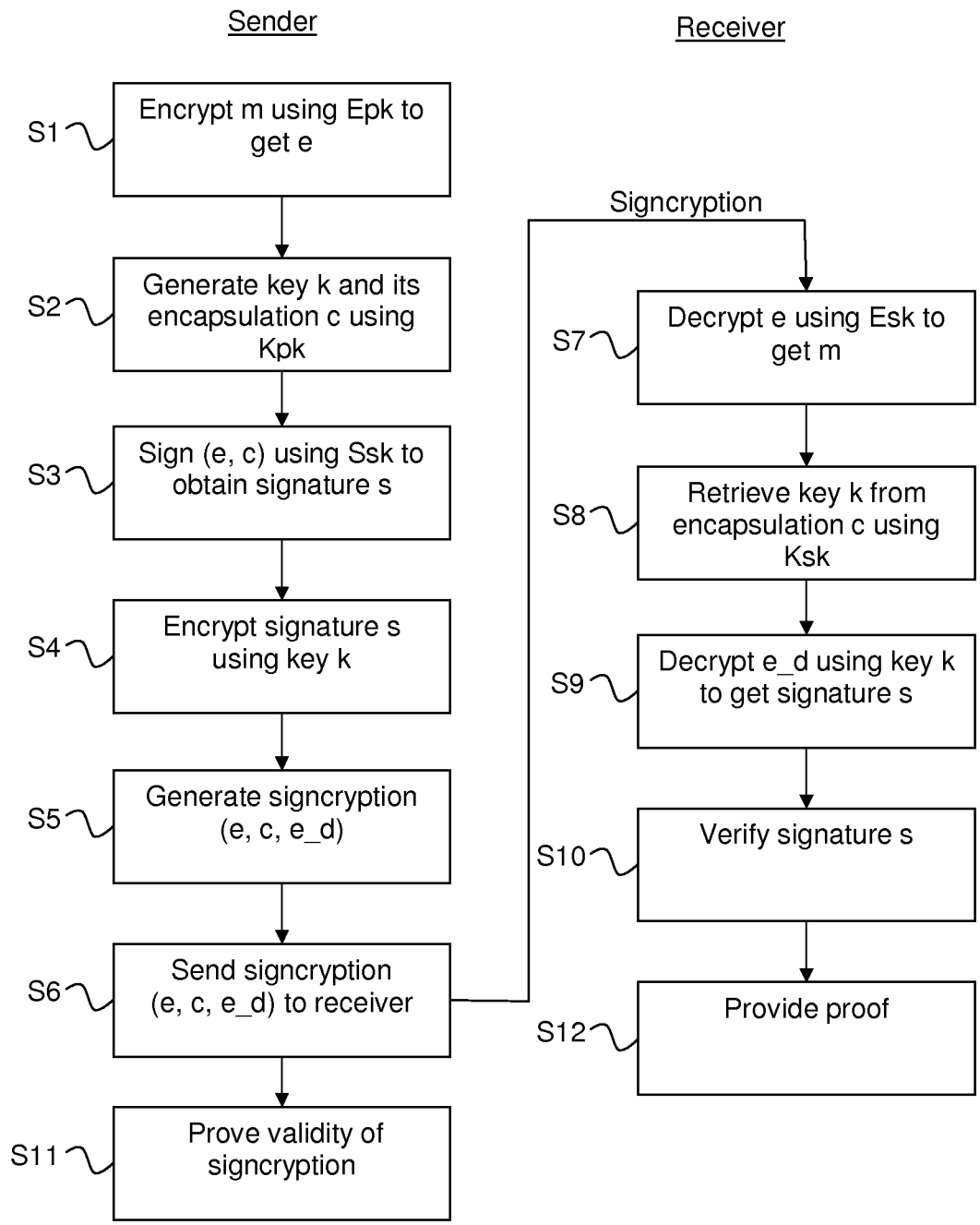
FIG. 2 illustrates a signcryption method according to a preferred embodiment of the invention.

A signcryption (SC) method according to a preferred embodiment of the present invention is illustrated in FIG. 2. The method uses a first encryption scheme E=(E.Keygen, E.Encrypt, E.Decrypt), a signature scheme S=(S.Keygen, S.Sign, S.Verify), and a second encryption scheme from the so-called KEM/DEM paradigm, which in reality comprises a key encapsulation and session key generation scheme K=(K.Keygen, K.Encapsulate, K.Decapsulate) and a second encryption scheme D=(D.Encrypt, D.Decrypt), which is symmetric.

A signcryption scheme SC can be obtained as follows.

First the necessary keys are generated. Calls are made to E.Keygen to get (Epk,Esk), to S.Keygen to get (Spk,Ssk), and to K.Keygen to get (Kpk,Ksk). The sender's key pair is set to (Spk,Ssk) and the receiver's key pair is set to ({Epk, Kpk}, {Esk,Ksk}). It will be appreciated that this step, including distribution of the keys, are beyond the scope of the present invention—any suitable method may be used, but it is preferred that the sender and the receiver generate their own key pairs. It is assumed that the sender and the receiver have the necessary keys to perform the method steps.

The sender uses the first encryption algorithm to encrypt plaintext m with Epk to get ciphertext e, e=E.Encrypt(m), step S1. The sender generates a key k and its encapsulation c using the encapsulation algorithm and Kpk, (c,k)=K.Encapsulate( ) step S2. Then the sender produces a signature on (e,c) using Ssk, s=S.sign(e,c), step S3. Finally, the sender uses the second encryption scheme to encrypt s with the key k, e_kd=D.Encrypt(s), step S4. The signcryption of m is formed by (e,c,e_d), step S5.

The sender then sends the signcryption (e,c,e_d) to the receiver, step S6.

The receiver uses Esk to decrypt e to get m, m=E.Decrypt (e), step S7. Then, the receiver retrieves k from c using Ksk, k=K.Decapsulate(c), step S8, and recovers s by decrypting e_d using the key k, s=D.Decrypt(e_d), step S9. Finally, the receiver uses Spk to check that the signature s is valid on (e,c) using S.Verify(s), step S10.

It is possible for the sender to prove knowledge of the decryption of e, and that e_d encrypts a valid signature on the concatenation of c and e using the key of the encapsulation, step S11. The receiver may prove that m is (or isn't) the decryption of e. He further proves knowledge of the decryption of (c,e_d), and that this decryption consists of a valid/invalid signature on (e,c), step S12.

The above construction accepts efficient instantiations if the underlying encryption schemes are homomorphic and the used signature scheme belongs to the class of signatures, "Class S", defined by Laila El Aimani in "On Generic Constructions of Designated Confirmer Signatures", INDOCRYPT 2009: 343-362, i.e. signature schemes that accept efficient proofs of knowledge of a signature: given a message m and a public key pk, the holder of pk and a signature s on m can efficiently prove knowledge of this signature s.

Such a class encompasses most popular signatures that have been proposed so far, e.g. RSA-FDH [Mihir Bellare, Phillip Rogaway: Random Oracles are Practical: A Paradigm for Designing Efficient Protocols. ACM Conference on Computer and Communications Security 1993: 62-73]:

1. RSA.Keygen: generate an RSA modulus N and an RSA key (pk=e,sk=d). Consider a collision-resistant hash function h which maps bit-strings to elements in $Z_N$.
2. RSA.Sign(m): a signature on m is computed as $s=h(m)^d$ mod N.
3. RSA.verify(m,s): check whether $s^e=h(m)$ mod N.

It is easy to see that the holder of s can prove knowledge of s by providing a proof of knowledge of the e-th root of h(m).

Figure 1:
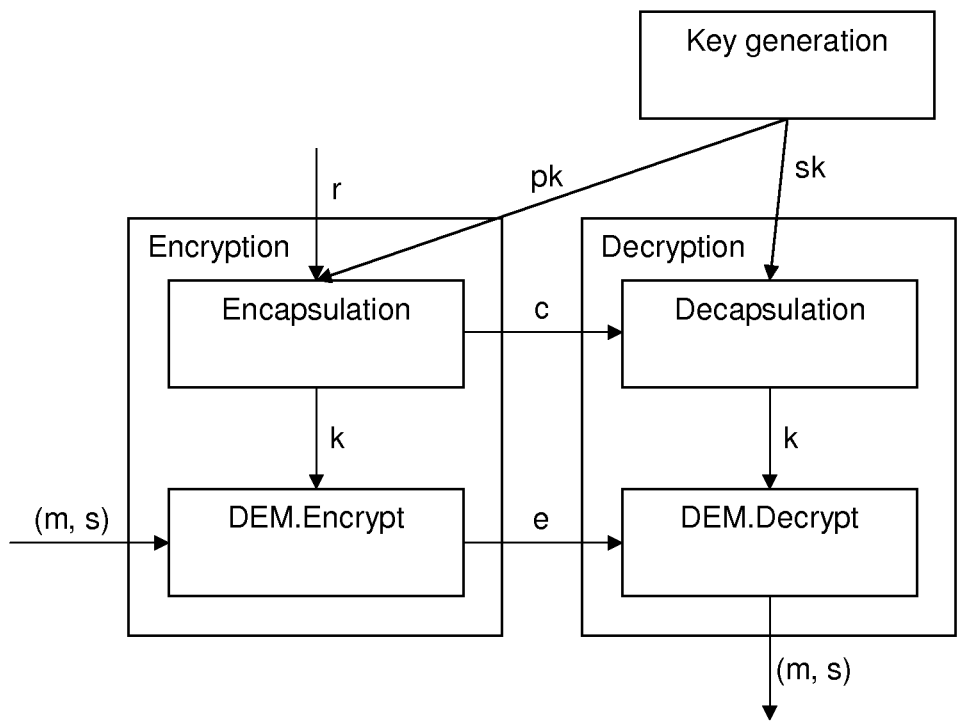
FIG. 1, already described, illustrates the prior art KEM/DEM paradigm scheme.
Figure 3:
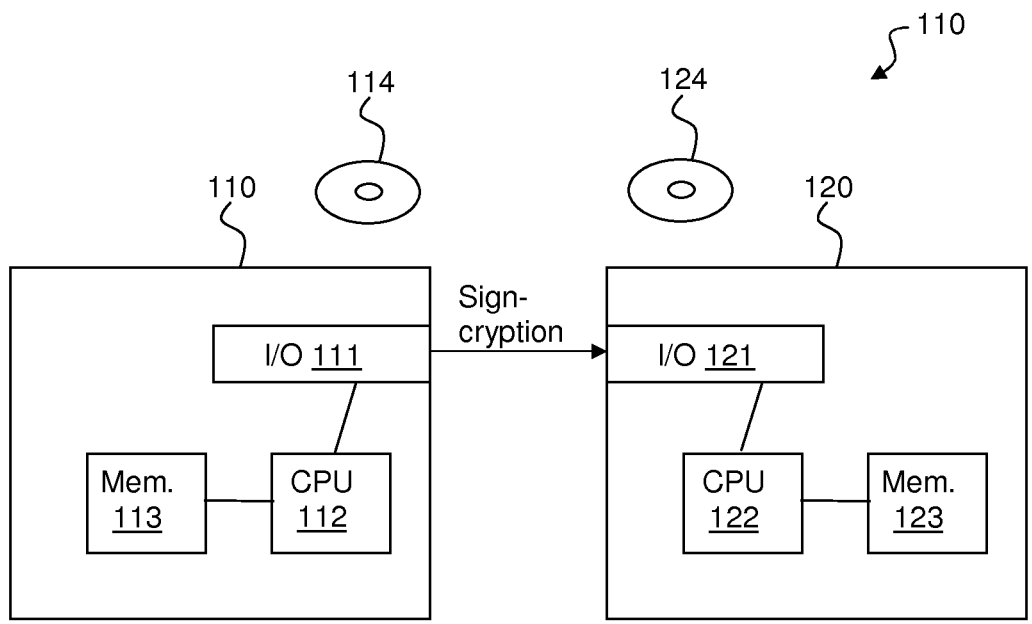
FIG. 3 illustrates a signcryption system according to a preferred embodiment of the invention.

FIG. 3 illustrates a system 100 for signcryption according to a preferred embodiment of the present invention. The system 100 comprises a sender 110 and a receiver 120, each comprising at least one interface unit 111, 121 adapted for communication with the other device, at least one processor ("processor") 112, 122 and at least one memory 113, 123 adapted for storing data, such as accumulators and intermediary calculation results. The processor 112 of the sender 110 is adapted to signcrypt a plaintext according to any of the embodiments of the inventive method, and the processor 122 of the receiver 120 is adapted to decrypt and verify a signcryption according to any of the embodiments of the inventive method. A first computer program product 114 such as a CD-ROM or a DVD comprises stored instructions that, when executed by the processor 112 of the sender 110, performs a signcryption of a plaintext according to any of the embodiments of the invention. A second computer program product 124 such as a CD-ROM or a DVD comprises stored instructions that, when executed by the processor 122 of the receiver 120, decrypts and verifies a signcryption according to any of the embodiments of the invention.

It will be appreciated that when compared to prior art signcryption methods, the present signcryption method can provide good performance, especially in terms of verifiability, while at the same time providing high security.

This improvement is owing to the fact that the construction combines the merits of the EtS and StE methods while avoiding their drawbacks.

Verifiability

To prove the validity of a signcryption (e,c,e_d) obtained using the method of the present invention, the sender needs to:
1. prove knowledge of the decryption of e,
2. prove the knowledge of the decryption of (c,e_d) and that this decryption is a valid signature on the concatenation of c and e.

Both proofs can be efficiently carried out if the used encryption schemes belong to "class E" and the used signature scheme belongs to "class S", which are both described in [Laila El Aimani in "On Generic Constructions of Designated Confirmer Signatures", INDOCRYPT 2009: 343-362] along with the mentioned proof protocols.

In the StE paradigm, a signcryption (on some message m) has the form (c,e), and the sender needs to prove knowledge of the decryption (c,e) and that the first part of this decryption is a valid signature on the concatenation of c and the remaining part of the decryption (namely m). Although this is possible from a theoretical point of view, any efficient ways to achieve this are however unknown at present. The same thing applies for the receiver's protocols, i.e. the confirm/deny protocols.

Better Privacy

Signcryptions of the present method comprise two ciphertexts, i.e. an attacker does not have the digital signatures in the clear. This improves privacy in two ways. First, contrary to the EtS paradigm it is possible to use an underlying signature scheme with a 'cheap' security requirement without affecting the indistinguishability property. Second, given a signcryption, it is not possible to check (if the second encryption scheme is anonymous) whether or not the sender was involved in the signcryption (contrary to EtS where anyone can check whether the digital signature—contained in the signcryption—is valid or not on the ciphertext).

Each feature disclosed in the description and (where appropriate) the claims and drawings may be provided independently or in any appropriate combination. Features described as being implemented in hardware may also be implemented in software, and vice versa. Reference numerals appearing in the claims are by way of illustration only and shall have no limiting effect on the scope of the claims.

The invention claimed is:

1. A method of signcrypting a plaintext m by a device, the method comprising, at the device:
   encrypting the plaintext m with a first encryption algorithm and a first public key Epk of a receiver to obtain a first ciphertext e;
   using a random r, an encapsulation algorithm and a second public key Kpk of the receiver to generate a session key k and an encapsulation c of the session key k;
   generating a signature s on the first ciphertext e and the encapsulation c with a signature algorithm using a private signature key Ssk of a sender;
   encrypting the signature s with a second encryption algorithm using the session key k to obtain a second ciphertext e_d;
   forming a signcryption using a processor from the first ciphertext e, the encapsulation c and the second ciphertext e_d; and
   outputting the signcryption.

2. The method of claim 1, further comprising proving knowledge of the decryption of the first ciphertext e and that the second ciphertext e_d encrypts a valid signature s on the encapsulation c and the first ciphertext e using the key of the encapsulation c.

3. A method of unsigncrypting a received signcryption of a plaintext m by a device, the signcryption comprising a first ciphertext e, an encapsulation c and a second ciphertext e_d, the method comprising at the device:

decrypting, using a processor, the first ciphertext e using a first decryption algorithm and a first private key Esk of a receiver of the signcryption corresponding to a first public key Epk of the receiver that was used to encrypt the first ciphertext e;

retrieving a session key k by decapsulating the encapsulation c using a decapsulation algorithm and a second private key Ksk of the receiver corresponding to a second public key Kpk of the receiver used to encapsulate the session key k;

recovering a signature s by decrypting the second ciphertext e_d using a second decryption algorithm and the session key k; and verifying that the signature s is correct using a verification algorithm and a public signature key Spk of a sender of the signcryption that corresponds to a private signature key Ssk of the sender used to generate the signature.

4. The method of claim 3, further comprising proving knowledge of the equality or inequality of the decryption of the plaintext m and the first ciphertext e, the decryption of the second ciphertext e_d and that the decryption is a valid digital signature on the first ciphertext e and the encapsulation c.

5. A signcryption device for signcrypting a plaintext m, the signcryption device comprising:

a processor configured to:

encrypt the plaintext m with a first encryption algorithm and a first public key Epk of a receiver to obtain a first ciphertext e;

use a random r, an encapsulation algorithm and a second public key Kpk of the receiver to generate a session key k and an encapsulation c of the session key k;

generate a signature s on the first ciphertext e and the encapsulation c with a signature algorithm using a private signature key Ssk of a sender;

encrypt the signature s with a second encryption algorithm using the session key k to obtain a second ciphertext e_d; and form a signcryption from the first ciphertext e, the encapsulation c and the second ciphertext e_d; and an interface configured to output the signcryption.

6. The signcryption device of claim 5, wherein the processor is further configured to prove knowledge of the decryption of the first ciphertext e and that the second ciphertext e_d encrypts a valid signature s on the encapsulation c and the first ciphertext e using the key of the encapsulation c.

7. A signcryption verification device for unsigncrypting a received signcryption of a plaintext m, the signcryption comprising a first ciphertext e, an encapsulation c and a second ciphertext e_d, the signcryption verification device comprising:

a processor configured to:

decrypt the first ciphertext e using a first decryption algorithm and a first private key Esk of a receiver of the signcryption corresponding to a first public key Epk of the receiver that was used to encrypt the first ciphertext e;

retrieve a session key k by decapsulating the encapsulation c using a decapsulation algorithm and a second private key Ksk of the receiver corresponding to a second public key Kpk of the receiver used to encapsulate the session key k;

recover a signature s by decrypting the second ciphertext e_d using a second decryption algorithm and the session key k; and verify that the signature s is correct using a verification algorithm and a public signature key Spk of a sender of the signcryption that corresponds to a private signature key Ssk of the sender used to generate the signature.

8. The signcryption verification device of claim 7, wherein the processor is further configured to prove knowledge of the equality or inequality of the decryption of the plaintext m and the first ciphertext e, and whether or not the signature s is a valid digital signature on the first ciphertext e and the encapsulation c.

9. A non-transitory computer program product having stored thereon instructions that, when executed by a processor, perform the method of claim 1.

10. A non-transitory computer program product having stored thereon instructions that, when executed by a processor, perform the method of claim 3.

\* \* \* \* \*